May 21, 1968 G. E. JARLAN 3,383,869
MARINE PIERS
Filed Jan. 18, 1965 4 Sheets-Sheet 3
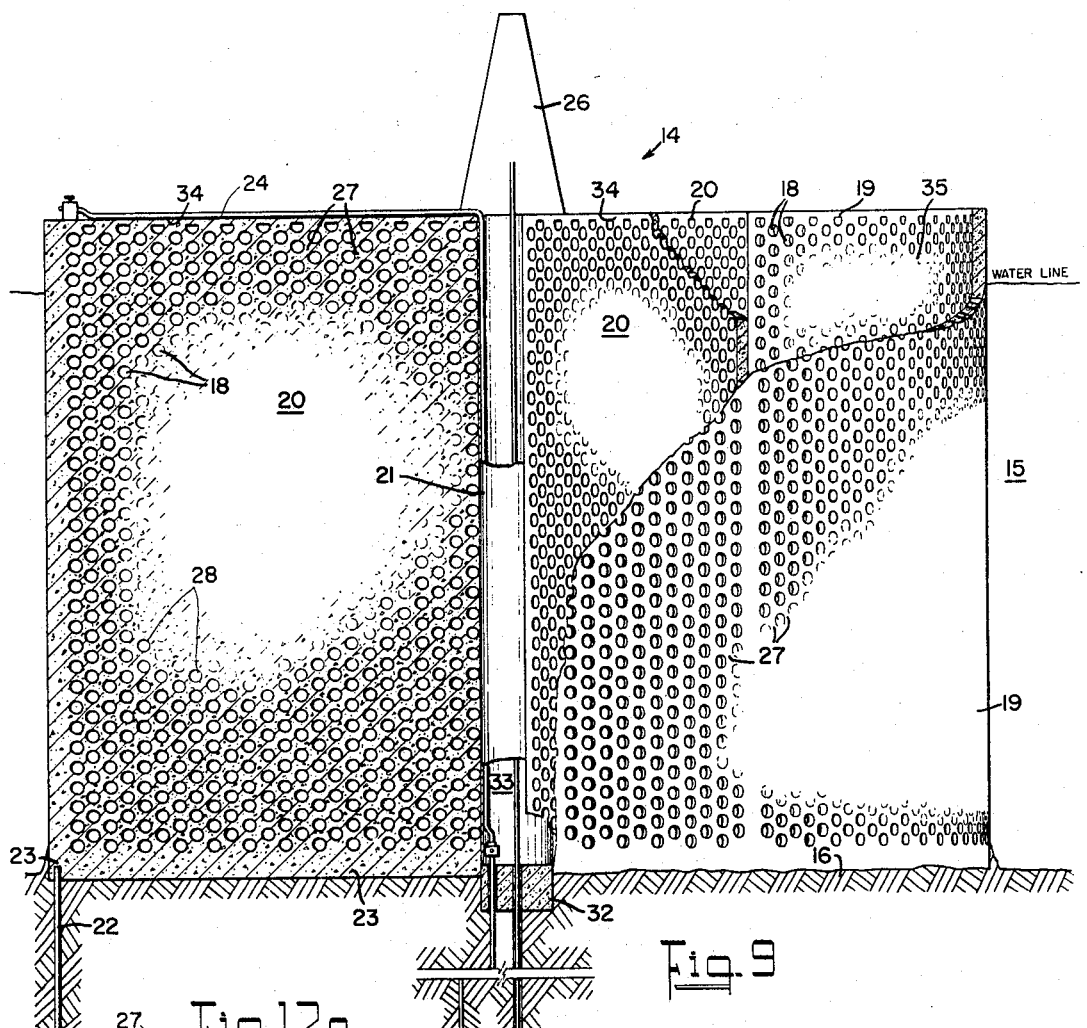
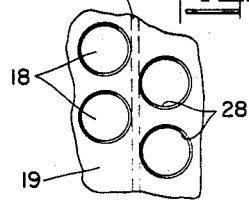
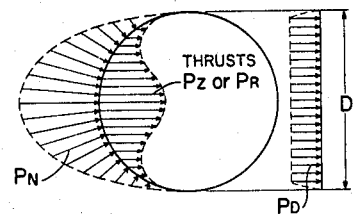
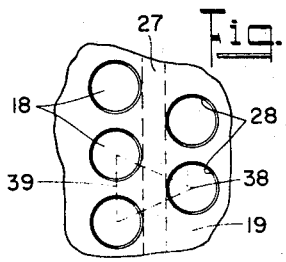
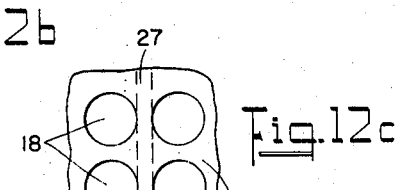
INVENTOR
Gerard Eugene JARLAN
PATENT AGENT

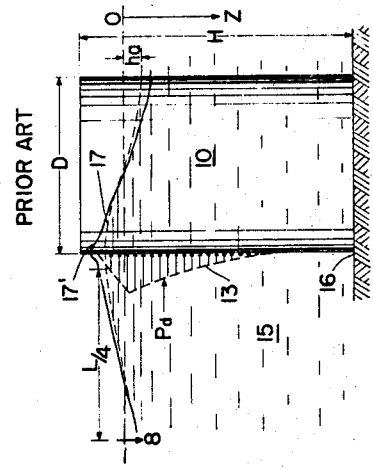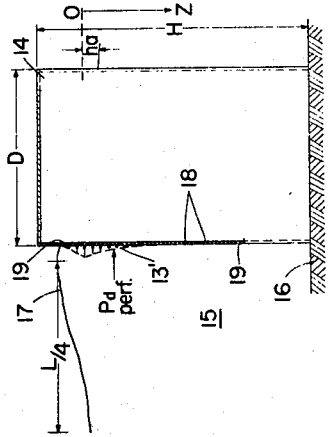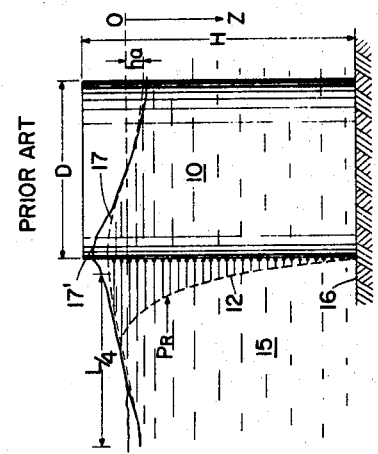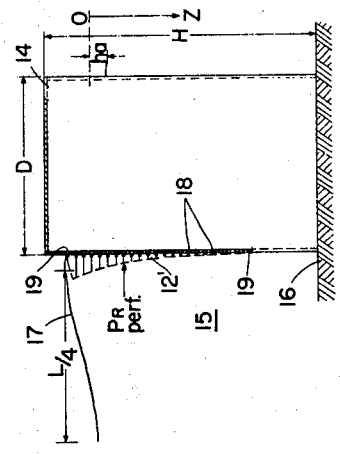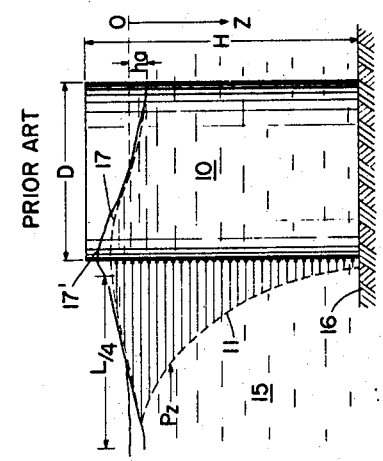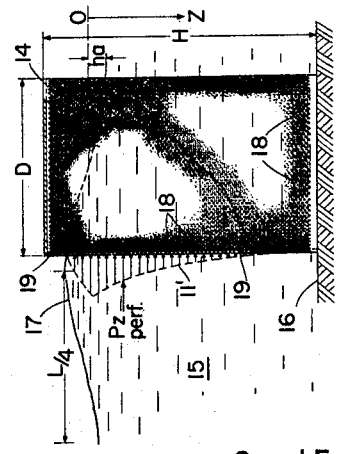

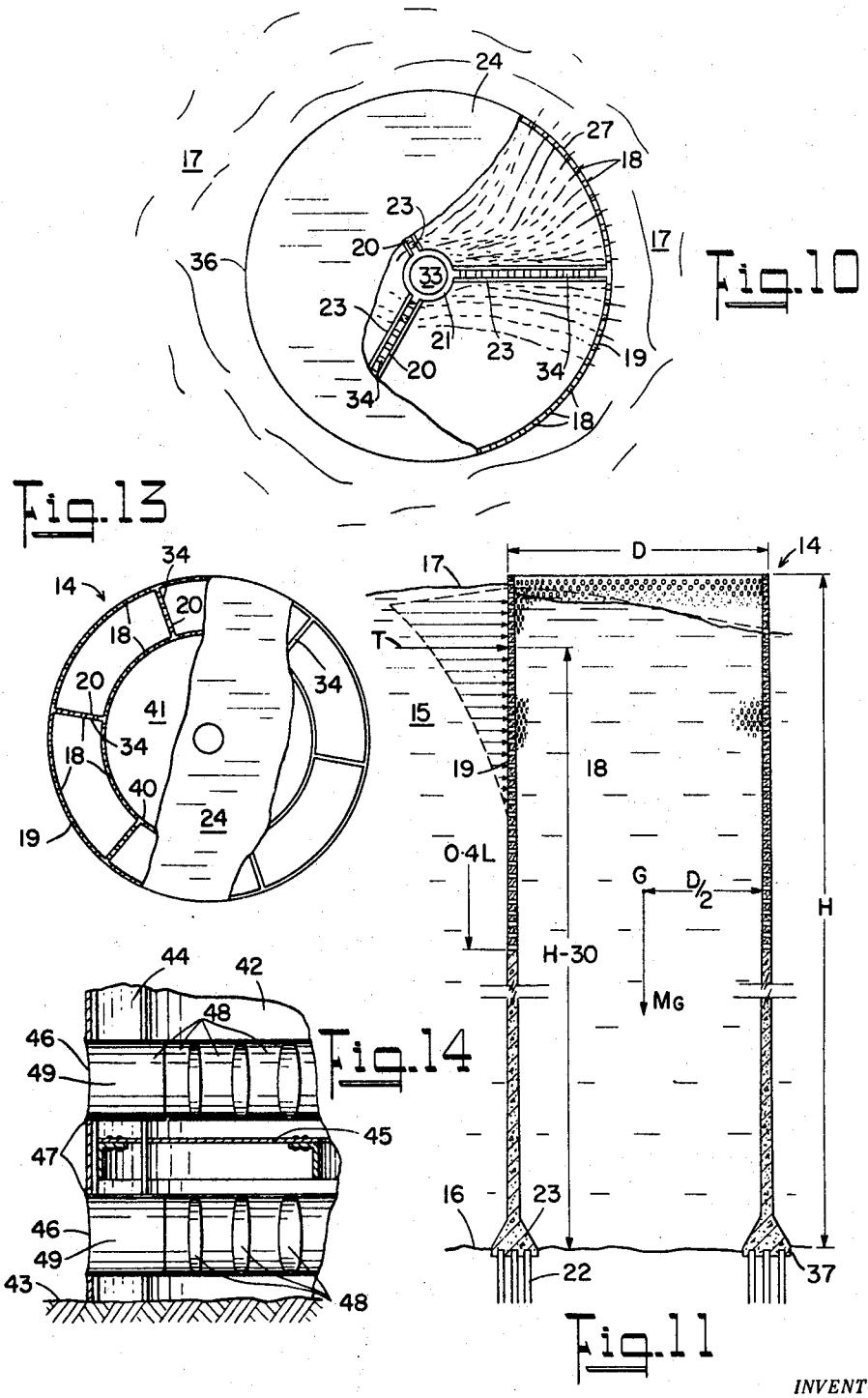

United States Patent Office 3,383,869
Patented May 21, 1968

3,383,869
MARINE PIERS
Gerard Eugene Jarlan, Ottawa, Ontario, Canada, assignor to Canadian Patents and Development Limited, Ottawa, Ontario, Canada, a corporation of Canada
Filed Jan. 18, 1965, Ser. No. 426,031
16 Claims. (Cl. 61—46)

This invention relates to structures sited on the seabed in deep water, and in particular concerns novel foundations or marine piers of large horizontal dimensions constructed as perforated shell-walled towers. The novel piers of this invention are characterised by their low wave energy scattering by their effective absorption of wave energy, and by virtual prevention of wave propagation through the structure. Consequently the forces to which such piers are subjected when impinged by trains of deep water waves are greatly reduced in comparison with the forces exerted on prior art piers of the same dimensions.

It is known that the lateral thrust of sea water against a stationary solid obstacle protruding above the sea surface and impinged by waves can be very large. The pressure due to a deep water wave having an amplitude of thirty feet, for example, when impinging upon a solid vertical transverse wall, has been observed to exceed twenty-five tons per square meter, since the wave height at the wall will be almost doubled in amplitude by reflection. Cylindrical bodies inherently sustain lower peak thrusts due to a lower wave energy scattering than that which occurs from extended wall structures which are more effective reflectors for wave energy. Very slender columnar forms such as piles or spars a few feet in diameter experience small thrust forces which are mainly due to the friction shear effect. However when the diameter of a cylindrical body exceeds about a half wavelength the thrust can reach several tons per square meter, since the wave energy scattering increases as a power of the ratio of diameter to wavelength.

When a solid cylindrical marine tower-work having a transverse dimension which is a significant part of the wavelength of a large amplitude deep water wave stands in the propagation path of trains of such waves, the structure is subjected to dynamic forces, the intensity of which is maximum when the crest of the wave augmented by any reflection amplitude is incident on it. The forces comprise three components, each exerting periodic horizontal thrust tending to move the structure about a transverse axis in its base. Their originating phenomena are related to the orbital particle motions of the wave and the magnitude of each component depends on the geometry of the obstacle and on the frequency of the forcing function. The resultant of these component forces lies somewhat below the free surface of the sea.

Throughout this specification, I intend the term "deep water" as used to signify a range of sea depths, to denote water of sufficient depth so that refraction due to bottom effects does not decrease the celerity of a given wave of period five seconds or longer. The five second interval is arbitrarily taken as the shortest period deep water wave to which offshore structures will be exposed, and since this wave "feels bottom" at about fifty feet depth, it is this depth which I set as the boundary between "deep" and "shallow" waters. It is to be understood that deep water for all longer period waves is deeper than fifty feet, and for a fully developed wave of amplitude thirty feet becomes a depth of more than 380 feet, although such large wave would break only if it propagates into a depth under 95 feet.

By the foregoing definition I therefore restrict the present invention to marine pier structures having a total height larger than about sixty feet above sea bed, and a maximum height very considerably above this figure, ranging upwards of a few hundred feet.

Assuming a train of waves of long period and having fully developed constant amplitude to be incident on an upright cylindrical structure, the phenomenon of greatest importance manifests itself as a hydrostatic pressure head, which exerts a normal hydrostatic pressure against the forward vertical surface of the structure. The lateral thrust force resulting from this pressure is maximum when the horizontal dimension of the structure measured in the direction of wave run is a half wavelength, so that when the forward side is impinged by the wave crest its rearward side lies in the wave trough. The unit pressure is computed from the relation:

$$P_Z = 2g\rho \cdot h_a \cdot \exp\left\{-2\pi \frac{Z}{L}\right\} \qquad (1)$$

where:
$P_Z$ is the unit pressure at any depth ($z$) below mean sea level
$h_a$ is the wave amplitude at the front of the structure, including reflection amplitude
$\rho$ is the density (mass per unit volume) of water
$g$ is the acceleration due to gravity, and
$L$ is the deep water wavelength The normal horizontal pressure is highest at a depth equal to the peak wave height below high-water level, and diminishes exponentially below that level, becoming smaller than about 0.1 times its peak value at a depth under 0.4 wavelengths. When the structure is a cylinder the pressure component which is aligned with the direction of wave run diminishes to either side of a vertical line in the most forward part of the body, and the height of the wave also decreases along its intersection with the cylinder surface, so that at any level the horizontally applied thrust may be taken as approximately equal to the peak frontal pressure effective over an area of about 40% of the diametral transverse distance.

The second phenomenon contributing important lateral thrust is associated with the piling up or ramming effect against the structure due to the momentum of moving sea water, and its peak value may be computed from the relation:

$$P_R = 4h_a^2 \frac{\pi \rho}{L} \cdot g \cdot \exp\left\{-2\pi \frac{Z}{L}\right\} \qquad (2)$$

where:
$P_R$ is the ram pressure per unit area at any depth ($z$)
$h_a$ is the wave amplitude including reflection amplitude The ram pressure will usually not exceed about a quarter of the pressure head $P_Z$ and is computed over the area of the body as projected on a vertical diametral transverse plane.

A third phenomenon associated with the dynamic effect of wave motion is manifested in lateral thrust due to friction shear arising out of the orbital movement of water particles. The wave motion comprises time-varying stream flow of very large proportions producing drag on the immersed part of the structure. The peak value of such drag force is computed by the relation:

$$P_d = C_D \cdot \rho 4\pi^2 \cdot h_a^2 \cdot \exp\left\{-2\pi \frac{Z}{L}\right\} \qquad (3)$$

where:

$P_d$ is the drag force at any depth ($z$)
$C_D$ is the drag coefficient for the body The magnitude of the thrust is about one-twelfth of the value of $P_Z$ and is dependent on the geometry and surface form of the body. This thrust diminishes exponentially with depth and is small below about a quarter wavelength depth, and at any level is computed over the area of the body as projected on a vertical diametral transverse plane.

Because the wave amplitude term ($h_a$) appears as a squared term in each of relations (2) and (3), and includes any reflection amplitude, structures producing significant reflection are subjected to correspondingly larger force components than those having low reflection coefficients.

In addition to the lateral forces due to waves, offshore structures must also withstand peak hurricane forces which may be very large, and which may apply sudden large loads.

Heretofore, large diameter solid piers have had to be built at great cost with very thick walls, or as massive monoliths well anchored to the seabed on relatively broad bases. The magnitude of the peak resultant horizontal pressure of a wave on a large pier can be so high that a masonry tower-work whose walls are sufficiently thick to resist the force would require exceedingly strong or even solid rock foundations to withstand the combined loading due to its weight and the overturning moment. The cost of such thick-walled structures increases disproportionately to their base diameter. Where the seabed comprises unconsolidated coastal or delta sediments, very costly mattress and footing structure must be provided. Except where the structure is sited in depths over a half wavelength of the longest significant waves, the clapotis induced by the reflection of waves by large diameter piers produces dynamic under pressures that cause seepage and erosion at the toe of the pier.

In an attempt to avoid the bulk and cost of the massive tower designs and to reduce the intensity of wave forces on the structure to the least possible value, it has been proposed to carry a platform for supporting an offshore structure such as apparatus for drilling oil wells upon a number of slender upright legs having their lower ends fixed in concrete slab bases. While such design reflects waves only to a slight degree and is subjected to minimal thrust due to wave scattering and hydrostatic pressure effects, rigidity requirements make it necessary to provide extensive bracing between the columns, so that the friction shear force or drag effect thereon due to wave motion has sometimes proven disastrous. In addition to the repeated deformation which the structure must undergo under wave attack, it must also wthstand the very large thrusts due to the violent gusts of wind in storms. The loss of certain offshore structures of this form (e.g., "Texas Towers") has been traced to the repeated resonating flexural strains of the open framework imposed jointly by hurricane winds and accompanying high seas. In addition to the instability and hazard to life incurred in the use of such structures, the full force of waves is exerted on any equipment such as a drill stem, or upon any solid tubular structures depending below them through the sea.

The present invention seeks to avoid the high cost of the rigid prior art solid pier forms and to greatly improve on the rigidity, stability, and safety of open prior art platform supports, and essentially consists in a rigid pier of large diameter for supporting an offshore platform or building structure, which is erected to stand on the seabed in deep water and to extend above high water level, consisting in an upright shell-walled column carried on seabed either directly or on a prepared foundation sunk below the sea, the shell wall being extensively perforated by a large plurality of transverse jet-guiding channels distributed uniformly over the wall area and the wall openings constituting between 20% and 60% of the total wall area and preferably about 40%, and enclosing a chamber at least 50 feet in diameter, the wall being braced to resist deformation.

According to one concept of my invention, the bracing means comprise, together with a deck closing the upper end of the pier, a group of angularly disposed upright wall members dividing the chamber within the pier into two or more equal connected compartments, each wall member being extensively perforated by a large plurality of regularly spaced transverse tubular passages, and being coextensive with the shell wall. The inner margins of these septa are preferably made integral with the wall of a coaxial cylindrical tube which is coextensive with the pier and which has its lower end beneath the sea, providing a dry working space and access therethrough to the seabed, as for exploratory and production drilling of offshore wells for petroleum gas and oil.

When the shell-wall thickness is made about three feet to four feet and the apertures comprise jet-guiding channels of circular cross-section having diameters also of about three to four feet, the structure is most effective to convert the potential energy of a wave incident on the wall into kinetic energy of jet flow through the channels, the jets issuing in a direction normal to the wall regardless of the wave motion at the entrance to the channel. The hydraulic head acting to produce jet flow may be as small as a few inches for optimally designed channels, and flow rates for a drop of a few feet can exceed thirty feet per second as the horizontal component of orbital velocity is added to the head velocity. If the channel length is made appreciably shorter than about 0.8 times its diameter, the jet-guiding action and head loss through friction become less effective, while if the channel length is below about 0.6 diameter it ceases to control the flow as a jet and allows substantial wave oscillatory energy to be transmitted through the wall. When the channel length is increased beyond one diameter, say to about four and a half feet for a three foot diameter, the friction loss increases substantially and adversely affects the jet velocity, making the mass transport of water less efficient and thereby increasing the wave scattering from the wall. In addition, the drag force is increased.

The effectiveness of the novel pier form of my invention for resisting wave attack is due to its inherent capability of absorbing incident wave energy and of transforming it to a form by which it exerts minimum forces on the structure without producing substantial reflection of wave energy. The apertured wall acts as a sort of barrier, slightly impeding the wave, and thereby developing a hydraulic head across the ends of the channels exposed, for example, to the crest of the wave. This hydraulic head generates jet flow through the wall along the myriad regularly spaced transverse channels which direct radial jets inwardly, conveying a large total flow at a considerable velocity through the forward sector of the wall, the transported mass having a kinetic energy equal to the greater part of the original wave energy. The jets do not change direction for any alteration in the orbital directions at the exterior of the wall, but follow the axes of the channels. The jets remain coherent for some distance, up to twenty or more diameters, but since they impinge each other and are moreover injected into turbulent aerated water within the pier, rapid dissipation through turbulent flow results. For good energy dissipation of jet flow ultimately as heat, an unobstructed radial flow path of at least twelve diameters, i.e., about forty to fifty feet, should be provided, and this distance may be increased to thirty diameters where the impact of the jets is required to be insignificant on any solid surfaces. The flow across the pier at incidence of the wave crest will be substantial so as to produce an increase in water level as the jets die out, and this head will give rise to streams issuing from the sides and rearward sector of the pier and into the wave trough as the relatively more rapidly travelling wave advances beyond the pier. A relatively smaller forward flow through the forward sector will also occur when the wave height at the front falls below the water level within the pier at the inside of the wall, as when the wave trough is passing the sector. However, no vertical component of the wave motion is transmitted into, out of, or through the pier. Such flow as issues outwardly of the pier is incapable of generating a new wave of the same period as the incident waves, and at best any disturbance produced in the sea around the pier comprises small amplitude, short period waves.

By virtue of the action described, the magnitude of each of the three component thrust forces ($P_z$, $P_R$, $P_d$) is reduced to a fraction of the corresponding thrusts exerted on a solid-walled pier of the same diameter, and a smaller thrust is developed than that exerted on an open framework or thin perforated wall of the same dimensions and aperturing ratio. The reduction in total wave thrust is due not only to the relatively free passage afforded to sea water by the jet-guiding channels, but also to the reduced wave height achieved by avoiding significant reflection effects at the frontal exterior surface and at the inside surface of the rearward wall sector, and absence of wave motion within the pier. Accordingly, there can be no wave reflection from any surface inside the pier, hence any solid vertical extended body inside it will receive no wave thrust or give rise to further reflection. It will be readily understood that since the energy of a wave is a function of the square of wave amplitude, any surface which produces negligible reflection sustains theoretically only a fourth of the force exerted on a totally reflecting wall.

In verification of the foregoing observations, model tests were carried out using perforated thin tubular walls formed as simple circularly apertured sheet screens, the openings of which were so short (0.15 diameter) as to be ineffective as jet-guiding channels, and showed that such screens act merely as a resistive barrier which does not alter the wave motion to any large extent, transmitting the incident wave with an amplitude only slightly decreased. Such thin screen wall moreover resulted in significant wave reflection from the frontal surfaces of the forward and the rearward sectors, in proportion to their unapertured area. And solid-walled extended structure within a pier of such thin-wall form would be subjected to nearly the full force of the wave, and also would experience the added thrust due to wave scattering from the pier surfaces.

I have found from corresponding model tests carried out using perforated, thick shell-walled pier models apertured to retain more than half of their exterior surface area intact, having circular openings formed as transverse channels of length equal to their diameter and scaled to represent three feet, that the impinging waves imposed a smaller thrust than that exerted on the aforesaid thin screen-walled pier of identical aperturing ratio and dimensions. The thrust contributions due to hydrostatic pressure head and ram pressure exerted on a correctly designed perforated thick-walled pier have been estimated to be only slightly greater for a given height of incident wave, than the thrust accounted for by the fluid friction of jet flow along the channels. Although there is an inevitable yet small wave reflection from the pier, any reflected wave amplitude automatically increases the flow and jet velocities correspondingly, tending to mitigate the incident wave. In the model studies the action of jets of seawater streaming radially through the shell wall inwardly and outwardly, the latter persisting for distances up to ten or more channel diameters, was observed to affect a volume of water surrounding the pier wherein the internal turbulence of the oncoming wave was increased. In this zone of turbulence the wave potential energy was somewhat lessened as the waves propagated therethrough. The turbulence of this zone and the existence of well organzied horizontal issue of water as jets in it can be regarded as the reason for the very low observed drag force on the structure, this hypothesis being consistent with the observed drop in drag on cylindrical bodies for flow around them at very large Reynolds numbers.

The invention is more specifically divulged in respect of its realization and construction, by and in the following description of its preferred embodiments, as illustrated by the accompanying figures of the drawing, wherein:

FIGURES 2, 3 and 4 are elevation views of a typical prior art solid pier in vertical diametral section illustrating wave force components acting on the pier at incidence of the crest of a large amplitude wave;

FIGURES 5, 6 and 7 are corresponding elevation views of a thick perforated shell-walled cylindrical pier according to the invention illustrating wave force components acting on the pier under the same conditions as for FIGURES 2, 3 and 4;

FIGURE 8 is a plan diagram showing the distribution at any level of FIGURES 2–7 of the horizontal force components;

FIGURE 9 is an elevation view partly in section showing a braced marine pier internally partitioned by septa, constructed according to the invention, carrying an offshore driling and well production platform;

FIGURE 10 is a plan view in horizontal cross-section taken on line 10—10 of FIGURE 9;

FIGURE 11 is an elevation view in vertical diametral section of a cylindrical shell-walled pier of extended height according to the invention carrying a platform load, diagramming gravity and overturning moments acting on the pier;

Figure 1:
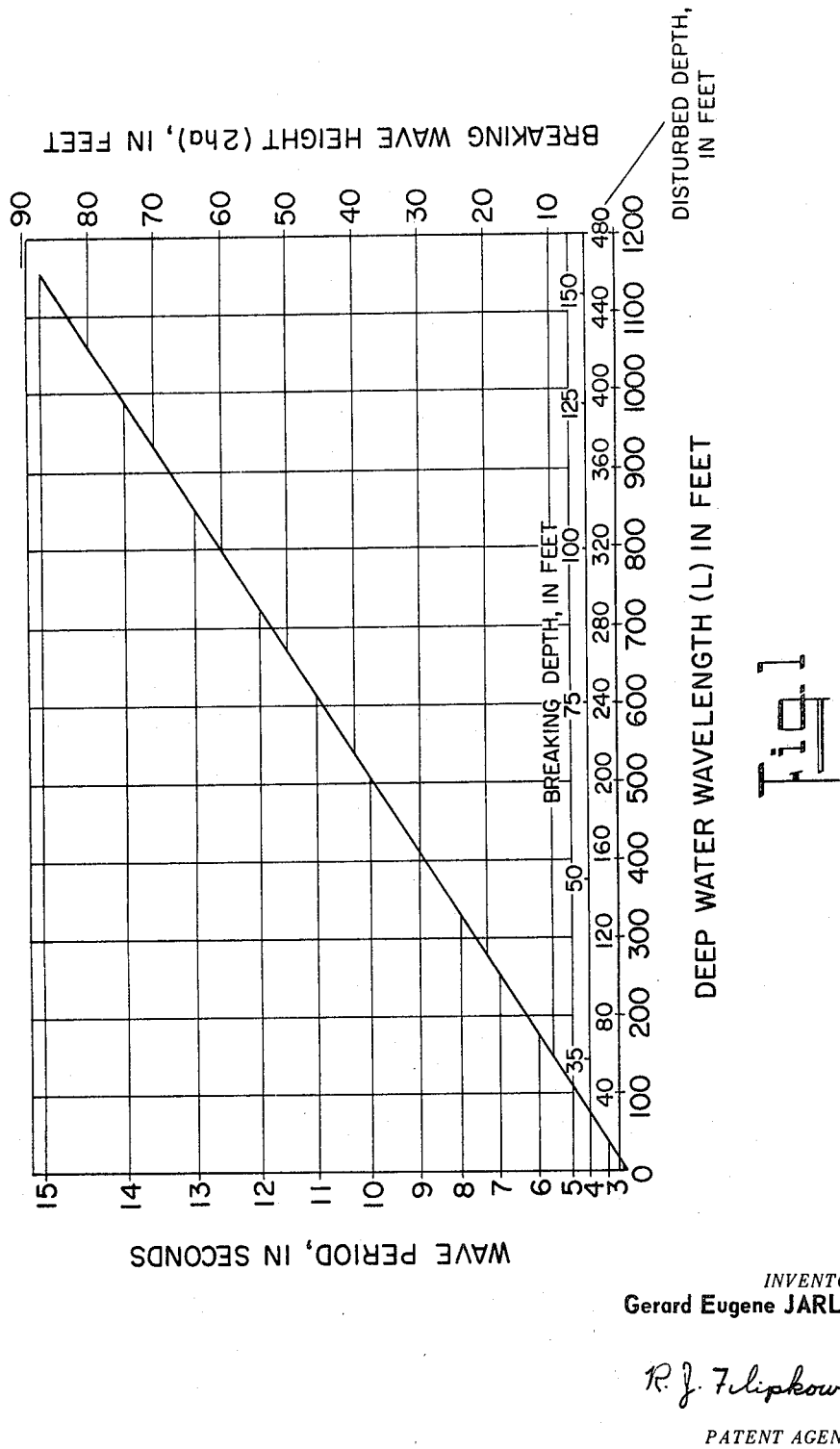
FIGURE 1 is a graph illustrating relevant parameters of wave motion of trains of waves likely to impinge offshore structures sited in deep water.

FIGURES 12a, 12b, and 12c show elevation views of various channel spacing patterns;

FIGURE 13 is an elevation view in vertical diametral section showing an alternative pier form of larger diameter for carrying a building structure and employing concentric perforated columns connected together by septa; and, FIGURE 14 is a detail cutaway elevation view showing an alternative single-walled ducted shell fabricated from steel plate and tube members.

Referring to the drawing, FIGURE 1, it will be seen that the deep water waves of long periods, when fully developed, may have a height of $2h_a$ of about 80 feet. Such waves are capable of exerting very large thrusts on solid tower or pier bodies as may be understood from an inspection of the preceding relations (1) to (3) expressing wave forces and of FIGURES 2–4. In computing the magnitudes of these forces the wave height quantity should include the reflection amplitude superimposed on the wave amplitude. It will also be apparent that except when a pier stands in a depth greater than about $5h_a$, prior art solid structures may suffer damaging erosion at the seabed.

A marine structure requires to be absolutely stable and durable and specifically to be capable of withstanding waves of the largest amplitude likely to be propagated to a given site. The depth of water for undisturbed propagation of a wave of amplitude 30 feet (wave height 60 feet) is in excess of 300 feet; nevertheless a pier of total height 130 feet above seabed can be impinged by 60 foot waves since a depth of 95 feet below mean sea level will still be deeper than their breaking depth.

Scale model tests of solid cylindrical pier forms 10 having an equivalent diameter of 200 feet, which correspond to between a quarter and a half wavelength of the longer ovean waves, were carried out with the piers standing in seawater 15 on seabed 16, as shown in FIGURES 2, 3 and 4. Prototype waves were generated and caused to impinge the structures. The magnitudes of $P_z$, $P_R$ and $P_d$ as diagrammed by the curved dashed outlines of vector groups 11, 12 and 13, were found to have a combined peak resultant thrust of over 6,000 pounds per square foot of frontal projected area when the prototype waves 17 had an amplitude of 30 feet. The hydrostatic and ram pressure components are concentrated over the mid-section of the pier as may be seen from FIGURE 8, whereas the drag force component is relatively uniform across the breadth.

Similar tests employing a shell-like scaled model pier 14 of the same dimensions as the solid pier, having a wall thickness representing three feet and having its entire cylindrical wall surface extensively perforated by transverse jet guiding channels 18 of the form shown by FIGURES 5, 6 and 7, have measured peak total thrusts for a corresponding wave which are about a fifth or less of the thrust components exerted on the solid cylindrical forms tested. The magnitude of the improvement may be understood from an inspection of the arrays of vectors designated $P_{z_{perf}}$, $P_{R_{perf}}$, and $P_{d_{perf}}$, bounded by the dashed curves 11', 12' and 13', whose magnitudes are from 20% down to about 12% of the corresponding vectors for the solid model. In addition, wave reflection at the forward side of the piers 10 was observed to increase the height of wave 17 at the crest by about 40%, producing a breaking crest as at 17', whereas the reflection caused by perforated wall 14 was below 10% when the aperturing ratio was 40%.

Referring specifically to FIGURES 9 and 10, one form of marine pier according to the invention, designated generally 14, comprises an integral reinforced cast concrete structure having an upright cylindrical thick shell wall 19, three uniformly angularly spaced upright dividing walls 20, hereinafter referred to as "septa," and a narrow tubular column 21. The structure stands on seabed 16, and where the sea bottom materials are structurally incompetent an array of piling 22 is provided below the sea and the lower margins 23 of the wall 19 and of the septa 20 are suitably widened, for example to a breadth of ten feet or more.

A deck 24 is provided, preferably being made integral with the upper ends of the shell wall 19 and the upper margins of the septa 20, thereby to brace these members as a rigid unit. A superstructure 25 supported on the deck may comprise, for example, working and living quarters, as well as a derrick 26 together with the neccessary storage spaces for supplies, materials, rigging, and drill pipe, casing, drive and draw works for a drilling operation. While the superstructure shown herein comprises a drilling rig for offshore well drilling and oil production, it is to be understood that the pier may be employed for any desired purpose and may carry a greatly extended deck (not shown) or elevated buildings.

Each of the septa and the shell wall are preferably made about three feet thick, and may be made up to about four feet thick, especially toward their lower ends. These upright members are regularly pierced by transverse jet-guiding cylindrical channels 18 which preferably are located over the entire vertical surface area in such spacing pattern as to provide unapertured vertical columnar wall portions 27, which latter serve as load-carrying members. When the jet-guiding channel diameters are about three feet and the channels are spaced slightly less than five feet apart in center-to-center distance in any direction, an aperturing ratio of about 50% is obtained. For lower aperturing ratios the spacing may be increased accordingly. Smoothly finished inner surfaces of the channels may be realized by employing liner tubes inserted into cast circular openings in the wall, such tubes 28 being suitably cemented in place in these openings. While channels 18 of slightly less or slightly greater diameter than three feet may be employed, the efficiency of head conversion by jet flow of seawater has been found to be optimum in channels very close to three feet in diameter and of the same length.

Useful reduction in thrust is achieved when the aperturing ratio is made as low as 20%, although wave reflection is substantially higher and the pier requires considerably more material for its erection. The wall area may be apertured to provide a perforation ratio up to about 60%, before the efficiency of conversion of hydraulic head to kinetic energy of jet flow becomes unsatisfactory. A highly perforated wall is moreover relatively weaker and requires substantially more reinforcement. The optimum reduction of peak wave thrust appears to be obtained with a broad spectrum of longer period waves when the aperturing ratio is close to 40%.

The diameter of central column 21 may be as small as desired, and may be about eight or ten feet to accommodate one or more well production and/or drilling operations. For example, when a prior well 29 has been completed with the borehole angled as shown, a drilling operation for sinking a subsequent borehole 30 may proceed to reach a production stratum 31 at a point spaced some distance from the bottom of well 29. A solid concrete plug 32 provides a foundation and bottom closure for column 21, the plug being drilled through and casing cemented thereinto in the usual manner, so that the chamber 33 within the column is kept dry.

Septa 20 may be omitted in piers narrower than about 80 feet diameter, but in larger piers these structures serve two useful purposes. In piers having diameters from 100 to 300 feet or more, the relatively thin curved walls 18 are stiffened and supported by providing a suitable number of septa to better enable the pier to withstand wave thrusts, while the upper margins 34 of the septa brace and support the deck 24 and assist in carrying concentrated loads such as the massive mud tanks and drill pipe stacks associated with a drilling operation. In addition the septa 20 subdivide the annular space 35 so that the multiple jet flow across thec hamber is deflected after the jets have traversed a distance of at least 30 to 40 feet from the shell wall 19, assisting in their extinction in turbulence. The jet-guiding channels 18 direct jets radially inwardly when the wave crest strikes the wall 19, as diagrammed at FIGURE 10, these jets being capable of persisting for distances up to thirty or more diameters from their guiding channels. The translation of water freely across the chamber by the combined flow of these jets is modified by the perforated dividing walls, which dissipate the horizontal stream energy as fine pattern turbulence with substantially no surge reaching the rearward sector 36. Each sub-chamber between the septa serves as a sort of surge chamber which assists in producing an out-of-phase relation between the chamber level and the water level outside the shell wall, somewhat as described in my U.S.A. Patent No. 3,118,282 for "Breakwater Structures." The marine pier of the present invention is not however intended to establish the considerable phase difference between varying vertical levels on opposite sides of a perforated front wall which the aforesaid invention had as its objective, since it is inherently incapable of storing temporarily a significantly large volume of water in a surge chamber, through lack of any solid rearward wall. Inasmuch as a considerably higher hydrostatic pressure would be developed in a pier braced by solid septa, either circumferential wall bracing structure or upright radial wall structure perforated to such extent as to aid in deflecting and dissipating jets is essential to the optimum thrust reduction which piers of the present invention seek to attain.

In actual measurements on scale models of piers, the presence of extensively perforated septa has been found to produce no increase in total thrust for any wave of a range of waves of from 5 to 15 seconds' period, and moreover the inclusion of such septa has been found to decrease the total peak thrust exerted by the more important longer waves propagating with larger amplitudes. In one instance a test with a prototype wave of amplitude 20 feet showed a thrust 7% below that measured for a perforated cylinder shell without septa.

The pier structure may be erected to any height, provided that the diameter and platform load are properly related, as will be made apparent hereinafter. When the pier diameter is about 140 feet and is of reinforced concrete construction, having at least the upper wall portion no thicker than three feet and perforated to an aperturing ratio of 40%, the weight of the structure is sufficient to resist the maximum overturning moment even when the deck, septa, and platform loads are omitted. Accordingly, larger diameter piers may be safely transported as floating bodies to an erection site and there sunk into position, without risking capsizing through impingement by large waves before any superstructure load is erected.

Referring now to FIGURE 11, the pier shown has a height H which is a multiple of its diameter D. It is subjected to a thrust force T directed horizontally as the resultant of the forces applied over the upper 0.4 wavelength distance, at a depth about 30 feet or less below mean sea level. For waves of amplitude 30 feet according to scale model tests, the thrust may be taken as 12 tons per foot of pier diameter for piers over 100 feet in diameter. The overturning moment $M_X$ may therefore be expressed by the relation:

$$M_X = 24{,}000.D(H-30) \qquad (4)$$

The gravity moment acting on the body is the product of the weight of structure (less buoyant force) and includes all platform and superstructure loads, acting through the center of gravity G, times the distance $D/2$, which is the horizontal distance between G and a transverse axis 37 in the seabed about which the pier would tilt in overturning, and is represented as $M_G$ in the relation:

$$M_G = W.D/2 \qquad (5)$$

For the structure depicted the weight W is 327(H)(D), hence relation (5) may be written:

$$M_G = 163(H)(D^2)$$

On dividing (4) and (5) by D, the opposed moments may be compared more meaningfully as follows:

$$24{,}000(H) - 720{,}000 \text{ versus } 163(H)(D)$$

By assuming a value for D about 145 feet, and specifically as:

$$D = 24{,}000/163$$

it will be apparent that the structure would have a gravity moment well above the overturning moment, regardless of its height H. It will be evident also that relatively slender piers may be erected in quite deep water, even when their diameter is as small as 60 feet, provided that the loading of the pier by superstructure such as buildings, roadways, drilling platforms, landing fields, and observation towers raises the pier weight W sufficiently. Merely by addition of three septa as described in piers over 100 feet in diameter, stable structures are ensured.

Specific patterns of aperturing as shown by FIGURES 12a, 12b, and 12c may be chosen to suit a given perforation ratio and to achieve a desirably large load-bearing wall strength. It will be apparent that trigonal spacing as shown in FIGURE 12a affords the highest aperturing ratios, and when the pattern is aligned so that the triangle formed by joining the axes of the three adjacent channels has one side, designated 39, vertical as shown by FIG. 12b, columnar portions 27 are provided. A smaller aperturing ratio may be achieved by distorting the triangle so that the apex 38 is spaced from the ends of vertical base 39 by a distance larger than the length of the base. The square pattern of FIGURE 12c may also be employed, and an aperturing ratio of 40% can be obtained with moderately good load-carrying wall strength.

The aperturing need not extend below a depth at which the wave thrust forces according to the relations (1), (2) and (3) would be fairly small; in general, the aperturing need not be extended lower than about the upper 150 feet of the wall height.

Referring to FIGURE 13, marine piers of larger diameters, for example several hundred feet in span, may be arranged to carry very substantial loads of superstructures such as hotels, apartment blocks, business offices, or factories above the open sea, by employing in addition to the perforated shell-wall 19, a concentric inner shell-wall 40 spaced inwardly from the outer wall by a distance upward of 60 feet. The concentric walls are joined together by transverse upright septa 20 at suitable intervals, for example every 150 feet of circumference of the outer wall. The central chamber 41 within the column 40 may be divided by further septa where its diameter is so great that deck 24 requires to be supported.

An alternative pier construction as shown in FIGURE 14 eliminates the shell wall as such, by utilizing an upright cylindrical steel tube fabricated of plate sections in the manner of a ship's hull, standing as an erect column 42 on a footing or base 43 in the seabed. The column is stiffened by vertical channels 44 spaced about the circumference of the column, and additionally by peripheral girder members 45 spaced apart vertically. The column is apertured as set out hereinabove, by a pattern of holes 46, each hole having an end 47 of a steel pipe 48 of diameter matching the hole diameter and a length between three and four feet integrally joined with the hole margin as by welding, to form transverse jet-guiding channels extending inwardly within the column. A suitable anti-corrosion coating 49 which may also be an anti-fouling compound is provided on all metal surfaces.

While the foregoing description has referred primarily to circular apertures and cylindrical jet-guiding channels, it is to be understood that I do not restrict the present invention to channels of circular section. The perforations may be elliptical or oval, square or rectangular, without departing from the essential jet-guiding channel function, although from the standpoint of economy of materials and highest efficiency the cylindrical channel form is preferred.

I claim:

1. A marine pier comprising an upright tubular column resting on seabed and extending above high water, said column having a diameter at least 50 feet and being apertured extensively over its surface by a large multiplicity of holes between three and four feet in diameter, the total cross sectional area of said holes comprising about 40% of the column surface area, each said hole having a tubular duct of matching diameter and length between three and four feet connected by one end with the margin of said hole, said ducts extending horizontally inwardly within the pier and providing an array of jet-guiding channels effective to produce translation of seawater in either direction when said pier is impinged by deep water waves, and means bracing said column to resist deformation under wave attack.

2. A pier as set forth in claim 1 wherein said bracing means comprise vertical beams spaced about said pier inwardly thereof and a series of vertically spaced annular ring channel section members.

3. A hollow marine pier of concrete reinforced construction comprising an upright tubular outer column standing on seabed in deep water and defining an enclosed space and having its upper margin extending above high water, a slender central column having its lower end in the seabed and having its interior open to the air, a plurality of erect planar septa dividing said space into equal sub-spaces and being integrally joined with said columns, said outer column having a thickness of from three to four feet in the upper levels of the sea and said outer column and said septa each being extensively perforated by a large plurality of uniformly spaced transverse jet-guiding channels connecting said enclosed space with the sea, the total channel cross-sectional area comprising about 40% of the surface area of said perforated members, each channel having cross-sectional area from 7 to 12 square feet.

4. A pier as set forth in claim 3 wherein said perforations extend below sea level for a distance equal to about five times the amplitude of the largest deep water wave to which the said pier may be exposed.

5. A pier as set forth in claim 3 wherein the lower portion of said outer column thickens with depth and is carried on a foundation in the seabed.

6. A pier as set forth in claim 5 wherein said foundation comprises arrays of piling sunk below the sea.

7. A marine pier for supporting an offshore structure having a low wave energy scattering when impinged by deep water waves comprising a tubular hollow body standing on the bed of the sea and extending above high water, said body having an upright wall at least 60 feet high delimiting an interior chamber the span of which is at least 50 feet, said wall being provided with a multiplicity of jet-guiding tubular channels passing transversely through said wall and being spaced uniformly over the wall area throughout a vertical zone subject to significant wave thrust forces, the cross-sectional areas of said channels being constant along their lengths and constituting a total area from about 20% to 60% of the elevational surface area of the apertured portion of said wall, said channels being effective when said body is under wave attack to constrain movement of seawater into and out of said chamber as jets issuing along the channel axes.

8. A marine pier as set forth in claim 7 wherein said total channel area constitutes about 40% of the elevational surface area of said apertured portion of the wall.

9. A marine pier as set forth in claim 7 wherein said channels are distributed over at least the upper 150 feet of the height of said wall.

10. A marine pier as set forth in claim 7 wherein the channels are cylindriform and have length/diameter ratios ranging from about 4/3 to about 3/4.

11. A marine pier as set forth in claim 8 wherein the channels are disposed in a pattern of vertical and peripheral rows and said wall is internally braced to resist deformation under wave pressure by a system of peripheral girders and vertical beams joined with said wall and extending into said chamber respectively between adjacent peripheral rows and between adjacent vertical rows.

12. A marine pier as set forth in claim 10 wherein said length/diameter ratio is very nearly 1:1.

13. A marine pier as set forth in claim 10 wherein said chamber has a circular plan and said channels are between three and four feet in length.

14. A marine pier as set forth in claim 13 further comprising a hollow tubular central column coextensive with said wall, said column and said wall being spaced apart a distance of at least 50 feet, and further comprising open bracing work in the form of a plurality of equi-angularly spaced upright planar septa joining said column with said wall, said septa being provided with transverse jet-guiding channels spaced uniformly over their vertical surface.

15. A marine pier as set forth in claim 14 wherein the upper margins of said septa lie in a plane common with the upper margin of said wall, and said pier is covered by a deck joined with said wall and said septa.

16. A marine pier as set forth in claim 15 wherein said channels are disposed in a pattern of vertical rows and wherein the channels of one row are disposed at an elevation intermediate the elevations of channels of adjoining rows, and said septa are joined with said wall along a zone lying between adjacent vertical rows.

References Cited

UNITED STATES PATENTS

| | | | |
|---|---|---|---|
| 2,940,266 | 6/1960 | Smith | 61—46 X |
| 3,248,886 | 5/1966 | Blenkarn | 61—54 X |
| 2,475,888 | 7/1949 | Hackett | 61—46 |

FOREIGN PATENTS

| | | |
|---|---|---|
| 407,575 | 1910 | France. |
| 1,289,872 | 1962 | France. |
| 304,341 | 1933 | Italy. |

JACOB SHAPIRO, *Primary Examiner.*